US012090511B2

(12) United States Patent
Pankoke

(10) Patent No.: US 12,090,511 B2
(45) Date of Patent: *Sep. 17, 2024

(54) METHOD AND APPARATUS FOR PRODUCING A DECORATIVE SURFACE

(71) Applicant: Hymmen GmbH Maschinen- und Anlagenbau, Bielefeld (DE)

(72) Inventor: René Pankoke, Bielefeld (DE)

(73) Assignee: Hymmen GmbH Maschinen—und Anlagenbau, Bielefeld (DE)

( * ) Notice: Subject to any disclaimer, the term of this patent is extended or adjusted under 35 U.S.C. 154(b) by 0 days.

This patent is subject to a terminal disclaimer.

(21) Appl. No.: 17/467,316

(22) Filed: Sep. 6, 2021

(65) Prior Publication Data

US 2021/0394232 A1 Dec. 23, 2021

Related U.S. Application Data

(63) Continuation of application No. 16/494,307, filed as application No. PCT/EP2018/065734 on Jun. 13, 2018, now Pat. No. 11,141,759.

(30) Foreign Application Priority Data

Jun. 13, 2017 (DE) ..................... 10 2017 113 035.7
Jun. 13, 2017 (DE) ..................... 10 2017 113 036.5
(Continued)

(51) Int. Cl.
*B41J 2/21* (2006.01)
*B05D 3/00* (2006.01)
(Continued)

(52) U.S. Cl.
CPC ............... *B05D 3/12* (2013.01); *B05D 3/002* (2013.01); *B05D 3/0486* (2013.01); *B05D 3/067* (2013.01);
(Continued)

(58) Field of Classification Search
CPC ...................................................... B41J 2/2114
See application file for complete search history.

(56) References Cited

U.S. PATENT DOCUMENTS

| | | | |
|---|---|---|---|
| 692,701 | A | 2/1902 | Burner |
| 3,308,227 | A | 3/1967 | Power et al. |

(Continued)

FOREIGN PATENT DOCUMENTS

| | | |
|---|---|---|
| AT | 387621 | 2/1989 |
| CA | 2406991 | 11/2001 |

(Continued)

OTHER PUBLICATIONS

Machine generated English translation of JP2009173003A to Nakamoto, “Woodgrain Decorative Panel and Mehtod for Manufacturing the Same”; retreived via espace.net.com on Jan. 4, 2024.*

(Continued)

*Primary Examiner* — Shelby L Fidler

(57) ABSTRACT

A method for producing a decorative surface having different gloss levels preferably comprising the following steps:

(C) feeding of a workpiece (1.0), which is coated with at least a first lacquer layer (1.4) to a digital printing station;
(D) provision of digital control data for the digital printing station;
(E) digital spraying of droplets on partial areas of the first lacquer layer (1.4) on the workpiece (1.0) with an at least partially transparent lacquer in order to apply a second lacquer layer (1.5) on the first lacquer layer (1.4), wherein after curing the second lacquer layer (1.5) has a different gloss level than the first lacquer layer (1.4).

Further disclosed is an apparatus for carrying out this method.

16 Claims, 2 Drawing Sheets

(30) Foreign Application Priority Data

| | | | |
|---|---|---|---|
| Feb. 19, 2018 | (EP) | ..................................... | 18157511 |
| Mar. 14, 2018 | (EP) | ..................................... | 18161725 |
| Mar. 16, 2018 | (EP) | ..................................... | 18162382 |
| Apr. 19, 2018 | (EP) | ..................................... | 18168263 |

(51) Int. Cl.

| | |
|---|---|
| ***B05D 3/04*** | (2006.01) |
| ***B05D 3/06*** | (2006.01) |
| ***B05D 3/12*** | (2006.01) |
| ***B05D 5/02*** | (2006.01) |
| ***B05D 7/00*** | (2006.01) |
| ***B41F 23/08*** | (2006.01) |
| ***B41J 3/407*** | (2006.01) |
| ***B41J 11/00*** | (2006.01) |
| ***B41M 3/06*** | (2006.01) |
| ***B41M 5/00*** | (2006.01) |
| ***B41M 7/00*** | (2006.01) |
| ***B44C 3/02*** | (2006.01) |
| *B05D 5/06* | (2006.01) |
| *B44C 5/04* | (2006.01) |
| *B44F 1/02* | (2006.01) |
| *B44F 9/02* | (2006.01) |
| *B44F 11/04* | (2006.01) |
| *E04F 13/08* | (2006.01) |
| *E04F 15/10* | (2006.01) |

(52) U.S. Cl.

CPC ............... *B05D 5/02* (2013.01); *B05D 7/584* (2013.01); *B41F 23/08* (2013.01); *B41J 2/2114* (2013.01); *B41J 3/407* (2013.01); *B41J 11/0015* (2013.01); *B41J 11/002* (2013.01); *B41M 3/06* (2013.01); *B41M 5/0047* (2013.01); *B41M 7/0027* (2013.01); *B41M 7/0045* (2013.01); *B41M 7/0054* (2013.01); *B41M 7/0081* (2013.01); *B41M 7/009* (2013.01); *B44C 3/02* (2013.01); *B05D 5/061* (2013.01); *B44C 5/04* (2013.01); *B44F 1/02* (2013.01); *B44F 9/02* (2013.01); *B44F 11/04* (2013.01); *E04F 13/0873* (2013.01); *E04F 15/107* (2013.01)

(56) References Cited

U.S. PATENT DOCUMENTS

| | | | | |
|---|---|---|---|---|
| 3,580,768 | A | 5/1971 | Kukla | |
| 3,676,963 | A | 7/1972 | Rice et al. | |
| 4,439,480 | A | 3/1984 | Sachs et al. | |
| 4,513,299 | A | 4/1985 | Lee et al. | |
| 4,557,778 | A | 12/1985 | Held | |
| 4,668,765 | A | 5/1987 | Drawert et al. | |
| 5,178,928 | A | 1/1993 | Goto et al. | |
| 5,241,908 | A | 9/1993 | Tateishi | |
| 5,306,783 | A | 4/1994 | Kirchgaessner et al. | |
| 5,358,737 | A | 10/1994 | Muees et al. | |
| 5,512,930 | A * | 4/1996 | Brandt | G06K 15/102 400/120.18 |
| 5,779,779 | A | 7/1998 | Jolly | |
| 6,120,845 | A | 9/2000 | Pease | |
| 6,150,009 | A | 11/2000 | Stecker | |
| 6,193,361 | B1 | 2/2001 | Wen | |
| 6,354,686 | B1 | 3/2002 | Tanaka et al. | |
| 6,375,777 | B1 | 4/2002 | Sjolin et al. | |
| 6,589,357 | B1 | 7/2003 | Wandres | |
| 6,621,087 | B1 | 9/2003 | Bisges et al. | |
| 6,830,305 | B1 | 12/2004 | Takizawa | |
| 6,927,014 | B1 | 8/2005 | Figov | |
| 7,001,016 | B2 | 2/2006 | Baxter et al. | |
| 9,006,680 | B2 | 4/2015 | Bettles et al. | |
| 9,266,382 | B2 | 2/2016 | Schacht et al. | |
| 11,141,759 | B2 * | 10/2021 | Pankoke | B41J 11/0015 |
| 11,511,318 | B2 | 11/2022 | Pankoke | |
| 2002/0018085 | A1 | 2/2002 | Asauchi et al. | |
| 2002/0061389 | A1 | 5/2002 | Brooker et al. | |
| 2003/0011651 | A1 | 1/2003 | Rupprecht et al. | |
| 2003/0152715 | A1 | 8/2003 | Beck et al. | |
| 2003/0167717 | A1 | 9/2003 | Garcia | |
| 2004/0028830 | A1 | 2/2004 | Bauer | |
| 2004/0048171 | A1 | 3/2004 | Grabher et al. | |
| 2004/0086678 | A1 | 5/2004 | Chen et al. | |
| 2004/0241416 | A1 | 12/2004 | Tian et al. | |
| 2005/0103182 | A1 | 5/2005 | Spurgeon | |
| 2005/0244571 | A1 | 11/2005 | Walheim | |
| 2005/0255249 | A1 | 11/2005 | Schlatterbeck et al. | |
| 2006/0075917 | A1 | 4/2006 | Edwards | |
| 2006/0092254 | A1 | 5/2006 | Claes et al. | |
| 2006/0130421 | A1 | 6/2006 | Nollet et al. | |
| 2006/0163371 | A1 | 7/2006 | Veil | |
| 2006/0209108 | A1 | 9/2006 | Hamazaki et al. | |
| 2006/0238554 | A1 | 10/2006 | Hosono et al. | |
| 2007/0076069 | A1 * | 4/2007 | Edwards | B41J 11/00216 347/100 |
| 2007/0160790 | A1 | 7/2007 | Kaneko et al. | |
| 2007/0235410 | A1 | 10/2007 | Wong et al. | |
| 2007/0283648 | A1 | 12/2007 | Chen | |
| 2007/0296790 | A1 | 12/2007 | Nakazawa et al. | |
| 2008/0074482 | A1 | 3/2008 | Makuta et al. | |
| 2008/0081116 | A1 | 4/2008 | Makuta et al. | |
| 2008/0084466 | A1 | 4/2008 | Makuta et al. | |
| 2008/0176039 | A1 | 7/2008 | Chen et al. | |
| 2008/0187680 | A1 | 8/2008 | Kawakami et al. | |
| 2008/0241481 | A1 | 10/2008 | Tokumoto et al. | |
| 2008/0266371 | A1 * | 10/2008 | Ma | C09D 11/322 347/21 |
| 2008/0280028 | A1 | 11/2008 | Albrecht et al. | |
| 2009/0098339 | A1 | 4/2009 | Marccau | |
| 2009/0225143 | A1 * | 9/2009 | Fukui | B41J 11/00214 347/102 |
| 2009/0246365 | A1 | 10/2009 | Ito et al. | |
| 2010/0092688 | A1 | 4/2010 | Serbutoviez et al. | |
| 2011/0067731 | A1 | 3/2011 | Satoh et al. | |
| 2011/0157272 | A1 * | 6/2011 | Ikehata | B41J 29/38 347/16 |
| 2011/0200750 | A1 * | 8/2011 | Meersseman | B41M 1/38 427/256 |
| 2012/0015107 | A1 | 1/2012 | Schacht et al. | |
| 2012/0108148 | A1 | 5/2012 | Capka | |
| 2013/0065024 | A1 | 3/2013 | Aruga et al. | |
| 2013/0101796 | A1 | 4/2013 | Arzt et al. | |
| 2013/0286088 | A1 | 10/2013 | Ryberg et al. | |
| 2013/0286095 | A1 | 10/2013 | Wada et al. | |
| 2013/0341532 | A1 | 12/2013 | Lee et al. | |
| 2014/0017452 | A1 * | 1/2014 | Pervan | B44C 1/24 427/510 |
| 2014/0343687 | A1 | 11/2014 | Jennissen | |
| 2015/0079793 | A1 | 3/2015 | Hattori | |
| 2016/0009932 | A1 | 1/2016 | Jang et al. | |
| 2016/0114619 | A1 | 4/2016 | Schacht et al. | |
| 2016/0205965 | A1 | 7/2016 | Elejalde et al. | |
| 2016/0215074 | A1 | 7/2016 | Homma et al. | |
| 2016/0238774 | A1 | 8/2016 | Koike et al. | |
| 2016/0297223 | A1 | 10/2016 | Langenscheidt et al. | |
| 2016/0332479 | A1 | 11/2016 | Clement | |
| 2017/0081522 | A1 | 3/2017 | Adam et al. | |
| 2017/0333936 | A1 | 11/2017 | Gibson et al. | |
| 2018/0056671 | A1 | 3/2018 | Boniface | |
| 2020/0016627 | A1 | 1/2020 | Pankoke | |
| 2020/0016629 | A1 | 1/2020 | Pankoke | |
| 2020/0023662 | A1 | 1/2020 | Pankoke | |
| 2020/0040799 | A1 | 2/2020 | Won | |
| 2020/0346246 | A1 | 11/2020 | Pankoke | |
| 2020/0346395 | A1 | 11/2020 | Pankoke | |
| 2020/0346484 | A1 | 11/2020 | Pankoke | |
| 2020/0368777 | A1 | 11/2020 | Pankoke | |
| 2021/0268542 | A1 | 9/2021 | Pankoke | |
| 2022/0379343 | A1 | 12/2022 | Pankoke | |

(56) References Cited

U.S. PATENT DOCUMENTS

| | | | |
|---|---|---|---|
| 2022/0379344 A1 | 12/2022 | Pankokc |
| 2023/0144445 A1 | 5/2023 | Pankokc |

FOREIGN PATENT DOCUMENTS

| | | | |
|---|---|---|---|
| CA | 2568440 | | 12/2005 |
| CN | 1166386 | | 12/1997 |
| CN | 1572380 | | 2/2005 |
| CN | 1653390 | | 8/2005 |
| CN | 101116987 | | 2/2008 |
| CN | 101301821 | | 11/2008 |
| CN | 101314981 | | 12/2008 |
| CN | 101342844 | | 1/2009 |
| CN | 102089088 | | 6/2011 |
| CN | 102256806 | | 11/2011 |
| CN | 102834188 | | 12/2012 |
| CN | 103035983 | | 4/2013 |
| CN | 103192656 | | 7/2013 |
| CN | 103209770 | | 7/2013 |
| CN | 103737464 | | 4/2014 |
| CN | 104039368 | | 9/2014 |
| CN | 105377521 | | 3/2016 |
| CN | 105835589 | | 8/2016 |
| CN | 207211033 | | 4/2018 |
| CN | 109395925 | | 3/2019 |
| DE | 3107798 | | 9/1982 |
| DE | 3331391 | | 3/1985 |
| DE | 69119743 | | 1/1997 |
| DE | 19532819 | | 3/1997 |
| DE | 19810455 | | 9/1999 |
| DE | 69709984 | | 9/2002 |
| DE | 10316695 | | 10/2004 |
| DE | 60009141 | | 10/2004 |
| DE | 60007560 | | 12/2004 |
| DE | 69732819 | | 4/2006 |
| DE | 102005043117 | | 3/2007 |
| DE | 102006003798 | | 7/2007 |
| DE | 102006042063 | | 3/2008 |
| DE | 102007019871 | | 10/2008 |
| DE | 102007055053 | | 5/2009 |
| DE | 102008024149 | | 12/2009 |
| DE | 102009004482 | | 7/2010 |
| DE | 102009043812 | | 3/2011 |
| DE | 102009044802 | | 12/2011 |
| DE | 102010052518 | | 5/2012 |
| DE | 102015107259 | | 11/2016 |
| DE | 102015110236 | | 12/2016 |
| DE | 102015110268 | | 12/2016 |
| DE | 102016120878 | | 5/2017 |
| DE | 102017113035 | | 12/2018 |
| DE | 4421559 | | 5/2020 |
| EP | 0019221 | | 11/1980 |
| EP | 0197267 | | 10/1986 |
| EP | 0210620 | | 2/1987 |
| EP | 0553421 | | 8/1993 |
| EP | 0372097 | | 6/1996 |
| EP | 0719647 | | 7/1996 |
| EP | 0810039 | | 12/1997 |
| EP | 0827838 | | 3/1998 |
| EP | 1101542 | | 5/2001 |
| EP | 1294578 | | 3/2003 |
| EP | 1384595 | | 1/2004 |
| EP | 1449667 | | 8/2004 |
| EP | 1454763 | | 9/2004 |
| EP | 1482085 | | 12/2004 |
| EP | 1652686 | | 5/2006 |
| EP | 1685974 | | 8/2006 |
| EP | 1728639 | | 12/2006 |
| EP | 1872959 | | 1/2008 |
| EP | 1902849 | | 3/2008 |
| EP | 1911594 | | 4/2008 |
| EP | 1952998 | | 8/2008 |
| EP | 2042335 | | 4/2009 |
| EP | 2050514 | | 4/2009 |
| EP | 1290290 | | 1/2010 |
| EP | 2174772 | | 4/2010 |
| EP | 2181860 | | 5/2010 |
| EP | 2251205 | | 11/2010 |
| EP | 2280130 | | 2/2011 |
| EP | 2301762 | | 3/2011 |
| EP | 2308682 | | 4/2011 |
| EP | 2343169 | | 7/2011 |
| EP | 2418019 | | 2/2012 |
| EP | 2786807 | | 10/2014 |
| EP | 2857221 | | 4/2015 |
| EP | 2873535 | | 5/2015 |
| EP | 2873536 | | 5/2015 |
| EP | 2883712 | | 6/2015 |
| EP | 3090882 | | 11/2016 |
| EP | 3109056 | | 12/2016 |
| EP | 3109056 | A1 † | 12/2016 |
| EP | 2555878 | | 12/2017 |
| EP | 3415316 | | 12/2018 |
| EP | 3415317 | | 12/2018 |
| EP | 3415318 | | 12/2018 |
| EP | 3415319 | | 12/2018 |
| EP | 3466677 | | 4/2019 |
| EP | 2883712 | B1 † | 8/2020 |
| EP | 2313281 | | 9/2020 |
| EP | 3875248 | | 9/2021 |
| EP | 3995645 | | 5/2022 |
| ES | 370796 | | 1/1972 |
| ES | 1018178 | | 1/1992 |
| ES | 2340456 | | 6/2010 |
| ES | 2349527 | | 1/2011 |
| ES | 2586981 | | 10/2016 |
| FR | 2936965 | | 4/2010 |
| FR | 2946959 | | 12/2010 |
| GB | 1405643 | | 9/1975 |
| JP | 59-169575 | | 9/1984 |
| JP | H05-278400 | | 10/1993 |
| JP | H06-115057 | | 4/1994 |
| JP | 06-270372 | | 9/1994 |
| JP | 09323434 | | 12/1997 |
| JP | 2003-285000 | | 10/2003 |
| JP | 2004-042548 | | 2/2004 |
| JP | 2004-134760 | | 4/2004 |
| JP | 2008-093910 | | 4/2008 |
| JP | 2008-246993 | | 10/2008 |
| JP | 2009173003 | A * | 8/2009 |
| JP | 2010-069684 | | 4/2010 |
| JP | 2011-173091 | | 9/2011 |
| JP | 2015054481 | A * | 3/2015 |
| JP | 2017-200740 | | 11/2017 |
| KR | 1020030083066 | | 10/2003 |
| KR | 1020060004828 | | 1/2006 |
| KR | 1020090066585 | | 6/2009 |
| KR | 2010-0120434 | | 11/2010 |
| KR | 10-2017-0045717 | | 4/2017 |
| RU | 2005132339 | | 4/2007 |
| WO | WO 90/015673 | | 12/1990 |
| WO | WO 96/08366 | | 3/1996 |
| WO | WO 98/08687 | | 3/1998 |
| WO | WO 99/012736 | | 3/1999 |
| WO | WO 99/67227 | | 12/1999 |
| WO | WO 00/30856 | | 6/2000 |
| WO | WO 01/47718 | | 7/2001 |
| WO | WO 02/08346 | | 1/2002 |
| WO | WO 02/033740 | | 4/2002 |
| WO | WO 02/068189 | | 9/2002 |
| WO | WO 2003/099456 | | 12/2003 |
| WO | WO 2005/116361 | | 12/2005 |
| WO | WO 2006/037644 | | 4/2006 |
| WO | WO 2006/080362 | | 8/2006 |
| WO | WO 2007/026172 | | 3/2007 |
| WO | WO 2007/088245 | | 8/2007 |
| WO | WO 2008/089021 | | 7/2008 |
| WO | WO 2008/110883 | | 9/2008 |
| WO | WO 2008/132126 | | 11/2008 |
| WO | WO 2009/111731 | | 9/2009 |
| WO | WO 2010/070485 | | 6/2010 |
| WO | WO 2010/079014 | | 7/2010 |
| WO | WO 2011/064075 | | 6/2011 |
| WO | WO2011064075 | A2 † | 6/2011 |

(56) References Cited

FOREIGN PATENT DOCUMENTS

| | | | |
|---|---|---|---|
| WO | WO 2011/126148 | | 10/2011 |
| WO | WO 2014/184418 | | 11/2014 |
| WO | WO 2015/078449 | | 6/2015 |
| WO | WO 2016/014617 | | 1/2016 |
| WO | WO 2016/142510 | | 9/2016 |
| WO | WO2018069874 | † | 10/2017 |
| WO | WO 2017/204361 | | 11/2017 |
| WO | WO 2018/229170 | | 12/2018 |
| WO | WO 2020/039361 | | 2/2020 |

OTHER PUBLICATIONS

Machine generated English translation of JP201554481 to Ito, "Decorative Laminate and Method of Producing Decorative Laminate"; retreived via espace.net.com on Jan. 4, 2024.*

Official Action Dated Oct. 13, 2022 from the US Patent and Trademark Office Re. U.S. Appl. No. 16/865,356. (65 pages).

Wijshoff "The Dynamics of the Piezo Inkjet Printhead Operation", Physics Report, 491(4-5): 77-177, Available Online Mar. 31, 2010.

Notice of Allowance Dated Apr. 20, 2022 from US Patent and Trademark Office Re. U.S. Appl. No. 16/494,309. (16 pages).

Notice of Allowance Dated Apr. 21, 2022 from US Patent and Trademark Office Re. U.S. Appl. No. 16/494,308. (16 pages).

"Barberan Industrial Solutions Since 1929", Barberan, English Transaltion, 10 P., Sep. 25, 2019.

"Darstellung Hilfslinie [Appearance Guideline]", 1 P.

"DIBUJO TEC 1 and TEC 2", 1P.

"Widerspruchsbegruendung and it's machine-translation in English".

"Yupo Corporation, product information", retrieved from the internet on Feb. 25, 2022.

Restriction Official Action Dated Jun. 29, 2022 from US Patent and Trademark Office Re. U.S. Appl. No. 17/322,966. (7 pages).

Screenshot Benutzeroberflaeche.

Baldwin "Bridging the Path to a Silicon Future", IMI 17th Annual Ink Jet Printing Conference, 28 P., Feb. 7, 2008.

Barberan "Auszug Auftragsbestaetigung Brohl Master Curing Primer", Barberan, 3 P., Nov. 15, 2018.

Barberan "Auszug Webseite Wellpappenmaschinentyp", Barberan, 1 P.

Barberan "Barberan Screenshots", Barberan, 4 P., 2020.

Barberan "BIJ-INKJET Modular Digital Printing Systems", Barberan, 7 P., 2020.

Barberan "Catalogues", Barberan, 9 P., Mar. 31, 2020.

Barberan "First Barberan Jetmasters in Germany", Barberan, Machine Transaltion, Mar. 16, 2021.

Barberan "Jetmaster 360 Printing Software Manual", Barberan, 58 P., Dec. 5, 2017.

Barberan "Jetmaster 360", Barberan, English Translation and Design, 12 P., Sep. 6, 2021.

Barberan "Jetmaster Series A", Barberian, 1 P., 2020.

Barberan "Jetmaster Series Catalogue", Barberan, 1 P., 2020.

Barberan "Jetmaster Series Waveform Configuration File for SEIKO RC1536 and 1024GS", Barberan, 1 P., Sep. 6, 2021.

Barberan "Screenshot User Interface", Barberan, 1 P.

Barberan. "Single Pass Jetmaster Series", Barbera, 5 P., 2020.

Boards of Appeal of the EPO "Beschwerdekammer/Communication of the Board of Appeal Jun. 19, 2019", Complaint file No. T0665/15-3.2.05.

Boards of Appeal of the European Patent Office "Opinion Board of Appeal", Boards of Appeal of the European Patent Office, English Translation, 22 P., Jun. 19, 2019.

Dennis van Ijzerloo "Digital Printing Singlepass", DIPA Symposium, English Translation , 35 P., Aug. 7, 2019.

Dreiss Patentanw?lte PartG mbB "Action for Annulament of the DE Part of EP 2313281", Dreiss Patentanw?lte PartG mbB, English Translation, 72 P., Oct. 2020.

Dreiss Patentanwälte PartG mbB "Action for annulment of the DE part of EP 2 313 281.Reference number of the action for annulment: 3 Ni 34/20 (EP)", Dreiss Patentanwälte PartG mbB, English Translation, 36 P., Jul. 19, 2021.

Düsseldorf Regional Court "Urteil/Judgemenet" Düsseldorf Regional Court, Nov. 25, 2021—12:20 0211 87565 1260 Regional Court Duesseldorf 3. Mar. 1982, Nov. 25, 2021.

Eladio Jesús "Histogram Tool Description", Barberan, 4 P., Jun. 1, 2021.

Epson "Variable Sized Droplet Technology", Epson, 3 P., 2022.

European Standard "Chipboard Definition and classification German version EN 309", European Standard, English Translation, 11 P., Aug. 1992.

Federal Patent Court "Nichtigkeitsklage gegen den DE-Teil des EP 2 313 281 Aktenzeichen der Nichtigkeitsklage: 3 Ni 34/20 (EP) or Action for annulment of the DE part of EP 2 313 281 Reference number of the action for annulment: 3 Ni 34/20 (EP), In response to the defendant's statement of opposition of Apr. 9, 2021", Jul. 19, 2021.

Finsa "Catalogue", Finsa, 11 P., Mar. 4, 2022.

Finsa "Data Sheet MDF-Board", Finsa, 4 P., 2008.

Global Graphics "Global Graphics News Release ", Global Graphics, 3 P., Jul. 10, 2018.

Global Graphics "How to Mitigate Artifacts in High-Speed Inkjet Printing: a White Paper 4th Edition", Global Graphics, 16 P., Sep. 2019.

Jet Master Series "Barinsa—Waveform Report", Jet Master Series, 14 P., Sep. 2020.

Kruss "Client Application Report", Kruss, 12 P., Oct. 20, 2020.

Kruss "Determination of Droplet Sizes with DSAInkjet", Kruss, 4 P., Oct. 20, 2020.

Laminat Magazin "Himmen Prospect", Laminat Magazin, 2 P., 2009.

Li&Co AG "MICODUR, Li&Co AG Confirmation of Purchase", Li&Co AG, 2 P., Sep. 8, 2021.

Lintec "Lintec Adhesives and Bonding", Lintec. 2 P., Mar. 2020.

Lintec "Lintec Product Information", Lintec, 4 P., 2020.

Meteor "MetCal for Print Calibration & Nozzle-Out Compensation", Meteor, 2 P., 2022.

Mimura et al. "Micro-Piezoelectric Head Technology of Color Inkjet Printer", International Conference on Digital Production Printing and Industrial Applications, 230-234 P., 2001.

Oji Tac Co.,Ltd. "OJI TAC", product information, Oji Tac Co.,Ltd., retrieved from the internet on Feb. 25, 2022.

PrintFlat "Corrects Inkjet Non-Uniformity Across the Web", PrintFlat, 7 P., Sep. 29, 2021.

Printing Industries of America "2019 Intertech Technology Award", Printing Industries of America, 34 P., 2019.

Seiko "508GS Greyscale Series Of Printheads", Seiko, 2 P., Sep. 18, 2020.

Seiko "Seiko, 508GS Greyscale Series Of Printheads, 2020", Seiko Holdings Group, Sep. 18, 2020.

SII Printek Inc. "Product Lineup—Inkjet Print Head—SII Printek Inc." retrieved from the internet on Mar. 8, 2021.

Toshiba "Brochure of CA3", Toshiba, 2 P., Jan. 12, 2022.

Toyo Ink Europe Specialty Chemicals D26 LIOJET UH021-YL-A10, Safety Data Sheet, Toyo Ink Europe Specialty Chemicals, Jan. 3, 2017.

Wallace et al. "Photo Realistic Ink Jet Printing ThroughDynamic Spot Size Control", Microfab, 9 P., Jun. 26, 2008.

Wikipedia "Archimedes Theorem about Sphere and Circular Cylinder", Wikipedia, English Translation, 7 P., Mar. 16, 2021.

Wikipedia "Corrugated Fiberboard", Wikipedia, 9 P., 2022.

WIkipedia "Haftone", Wikipedia, 9 P., Retrieved from the Internet on Oct. 4, 2021.

Wikipedia "Holz", Wikipedia, retrieved from the internet on Apr. 8, 2021.

Wikipedia "Lintec", Wikipedia, English Translation, 3 P., Feb. 25, 2022.

Wikipedia "Medium-density fibreboard", Wikipedia, retrived from the internet on Jul. 4, 2022.

Wikipedia "Melamine Resin", Wikipedia, retrieved from the internet on Jul. 7, 2022.

(56) References Cited

OTHER PUBLICATIONS

Wikipedia "Melaminharz", Wikipedia, retrieved from the internet on Mar. 2, 2022.
Wikipedia "Mitteldichte-Holzfaserplatte", Wikipedia, retrieved from the internet on Mar. 3, 2022.
Wikipedia "Paper", Wikipedia, retrieved from the internet on Jun. 24, 2022.
Wikipedia "Papier", Wikipedia, retrieved from the internet on Apr. 8, 2021.
Wikipedia "Satz des Archimedes aber Kugel und Kreiszylinder" with machine-translation, Wikipedia, retrived from the internet on Mar. 16, 2021.
Wikipedia "Syntetic Paper", Wikipedia, retrieved from the internet on Feb. 25, 2022.
Wikipedia "Wellpappe, Wikipedia", retrieved from the internet on Apr. 8, 2021.
Wikipedia "Wood, Wikipedia", retrieved from the internet on Jun. 24, 2022.
Wikipedia "Yupo (manufacturer)", wikipedia, retrieved from the internet on Feb. 25, 2022.
Xaar "Operating Parameters for XAAR 1001", Xaar, 7 P., 2008.
Xaar "Press Release Ligna 2009", XAAR, 6 P., May 18-22, 2009.
Xaar "User Manual(Handbuch) XAAR 1001", Xaar, 67 P., 2007.
Xaar - Technologies "The Wayback Machine", Xaar - Technologies, retrieved from the internet on Jun. 9, 2021.
Xaar Technology "Prospekt XAAR 1001", Xaar Technology.
Official Action Dated Oct. 18, 2021 from the US Patent and Trademark Office Re. U.S. Appl. No. 16/865,355. (56 pages).
Notice of Allowance Dated Jun. 7, 2022 from US Patent and Trademark Office Re. U.S. Appl. No. 16/865,355. (9 pages).
Restriction Official Action Dated May 27, 2022 from the US Patent and Trademark Office Re. U.S. Appl. No. 16/494,310. (10 pages).
Restriction Official Action Dated Jul. 28, 2022 from US Patent and Trademark Office Re. U.S. Appl. No. 16/865,356. (5 pages).
Final Official Action Dated Feb. 7, 2022 from US Patent and Trademark Office Re. U.S. Appl. No. 16/494,308. (17 pages).
Notice of Allowance Dated Aug. 24, 2022 from US Patent and Trademark Office Re. U.S. Appl. No. 16/494,308. (26 pages).
Official Action Dated Nov. 25, 2022 from the US Patent and Trademark Office Re. U.S. Appl. No. 16/494,310. (99 pages).
Official Action Dated Dec. 5, 2022 from the US Patent and Trademark Office Re. U.S. Appl. No. 17/883,623. (59 pages).
Official Action Dated Dec. 5, 2022 from the US Patent and Trademark Office Re. U.S. Appl. No. 17/883,626. (62 pages).
Final Official Action Dated Mar. 18, 2022 from US Patent and Trademark Office Re. U.S. Appl. No. 16/865,355. (24 pages).
Notice of Allowance Dated Oct. 3, 2022 from US Patent and Trademark Office Re. U.S. Appl. No. 16/758,056. (38 pages).
Official Action Dated May 31, 2023 from the US Patent and Trademark Office Re. U.S. Appl. No. 16/494,310. (35 pages).
Merriam-Webster "Formation." Merriam-Webster.com Dictionary, Merriam-Webster, https://www.merriam-webster.com/dictionary/formation. Accessed Jun. 1, 2023.
Official Action Dated Apr. 5, 2023 from the US Patent and Trademark Office Re. U.S. Appl. No. 16/865,356. (18 pages).
European Search Report and the European Search Opinion Dated Jun. 20, 2023 From the European Patent Office Re. Application No. 23159373.2. (17 Pages).
Final Official Action Dated Feb. 18, 2021 From the US Patent and Trademark Office Re. U.S. Appl. No. 16/494,307. (21 Pages).
International Search Report and Written Opinion Dated Sep. 3, 2018 From the International Searching Authority Re. Application No. PCT/EP2018/065731 and its English Translation. (16 Pages).
International Search Report and Written Opinion Dated Sep. 5, 2018 From the International Searching Authority Re. Application No. PCT/EP2018/065737 and its English Translation. (14 Pages).
International Search Report and Written Opinion Dated Aug. 31, 2018 From the International Searching Authority Re. Application No. PCT/EP2018/065734 and its English Translation. (14 Pages).
International Search Report and Written Opinion Dated Aug. 31, 2018 From the International Searching Authority Re. Application No. PCT/EP2018/065738 and its English Translation. (13 Pages).
Notice of Allowance Dated May 26, 2021 From the US Patent and Trademark Office Re. U.S. Appl. No. 16/494,307. (7 Pages).
Official Action Dated Aug. 27, 2020 from the US Patent and Trademark Office Re. U.S. Appl. No. 16/494,307. (26 pages).
Official Action with Third-Party Submission Dated Sep. 10, 2021 From the US Patent and Trademark Office Re. U.S. Appl. No. 16/494,308. (50 Pages).
Restriction Official Action Dated Apr. 26, 2021 from the US Patent and Trademark Office Re. U.S. Appl. No. 16/494,308. (6 pages).
Restriction Official Action Dated Jul. 7, 2021 from the US Patent and Trademark Office Re. U.S. Appl. No. 16/865,355. (6 pages).
Third Party Submission under 37 CFR 1.290 filed on Jan. 29, 2021 From the US Patent and Trademark Office Re. U.S. Appl. No. 16/494,308.(2 Pages).
Third Party Submission under 37 CFR 1.290 filed on Jan. 29, 2021 From the US Patent and Trademark Office Re. U.S. Appl. No. 16/494,309.(2 Pages).
Third-Party Submission Under 37 CFR 1.290 filed Jan. 29, 2021 From the US Patent and Trademark Office Re. U.S. Appl. No. 16/494,310. (2 Pages).
USPTO Communication Dated Feb. 11, 2021 RE Third-Party Submission From the US Patent and Trademark Office Re. U.S. Appl. No. 16/494,309.(2 Pages).
USPTO Communication Dated Feb. 3, 2021 RE Third-Party Submission From the US Patent and Trademark Office Re. U.S. Appl. No. 16/494,308.(2 Pages).
USPTO Communication Dated Feb. 3, 2021 RE Third-Party Submission From the US Patent and Trademark Office Re. U.S. Appl. No. 16/494,310.(2 Pages).
Barniz Entry in the Online Dictionary of the Spanish Language of the Real Academia, 3.P., Jun. 10, 2020.
Beuth "Paints and Varnishes—Determination of Gloss Value at 20°, 60° and 85° (ISO 2813:2014); German Version EN ISO 2813:2014", Beuth Publishing DIN, 2 P., Feb. 2015.
Emmler "Neue Entwicklungen bei der Industriellen Beschichtung von Holz und Holzwerkstoffen fuer Innenanwendungen", Technische Universitaet Dresden, Fakultaet Maschinenwese, Institut fuer Holz- und Papiertechnik, Tagungsband des 14. Holztechnologischen Kolloquiums, Dresden, Germany, Apr. 8-9, 2010, Schriftenreihe Holz- und Papiertechnik, 5: 120-125, Apr. 8, 2010.
Ezzeldin et al. "Improving the Performance of an Inkjet Printhead Using Model Predictive Control," Preprints of the 18th IFAC World Congress, Sep. 2, 2011: 11544-11549.
Real Academia Espanola "Barniz", Diccionario de la Lengua Espanola - Edicion del Tricentanario, Real Academia Espanola, Definition, 3 P., Oct. 11, 2014.
Von Aufschnaiter "Industrial Ceramic Tile Manufacturing", Durst Phototechnik, Slideshow, p. 1-18, Nov. 3, 2014.
Wikipedia "Inkjet Printing", Wikipedia, p. 1-15, Last Edited Aug. 31, 2020.
Wikipedia "Ultraviolet", Wikipedia, the Free Encyclopedia, 29 P., Jun. 12, 2017.
Wikipedia "UV Curing", Wikipedia the Free Encyclopedia, 3 P. Apr. 12, 2017.
Official Action Dated Dec. 8, 2021 from US Patent and Trademark Office Re. U.S. Appl. No. 16/494,309. (62 pages).
Third Party IDS Submission under 37 CFR 1.290 filed on Nov. 4, 2021 From the US Patent and Trademark Office Re. U.S. Appl. No. 16/865,356.(3 Pages).
Third Party IDS Submission under 37 CFR 1.290 filed on Oct. 15, 2021 From the US Patent and Trademark Office Re. U.S. Appl. No. 16/865,355.(2 Pages).
Third Party Submission under 37 CFR 1.290 filed on Nov. 28, 2021 From the US Patent and Trademark Office Re. U.S. Appl. No. 16/865,358.(3 Pages).
USPTO Communication Dated Dec. 1, 2021 RE Third-Party Submission From the US Patent and Trademark Office Re. U.S. Appl. No. 16/865,358.(2 Pages).

(56) References Cited

OTHER PUBLICATIONS

USPTO Communication Dated Nov. 10, 2021 RE Third-Party Submission From the US Patent and Trademark Office Re. U.S. Appl. No. 16/865,356.(2 Pages).
USPTO Communication dated Oct. 25, 2021 RE Third Party Submission From the US Patent and Trademark Office Re. U.S. Appl. No. 16/865,355.(2 Pages).
Restriction Official Action Dated Apr. 26, 2023 from the US Patent and Trademark Office Re. U.S. Appl. No. 18/092,347. (6 pages).
Notice of Allowance Mar. 15, 2023 from the US Patent and Trademark Office Re. U.S. Appl. No. 17/883,623. (15 pages).
Notice of Allowance Mar. 16, 2023 from the US Patent and Trademark Office Re. U.S. Appl. No. 17/883,626. (12 pages).
Official Action Dated Dec. 20, 2023 from the US Patent and Trademark Office Re. U.S. Appl. No. 18/092,347. (22 pages).
Third Party IDS Submission under 37 CFR 1.290 filed on Aug. 15, 2022 From the US Patent and Trademark Office Re. U.S. Appl. No. 16/494,310.(2 Pages).
Third Party IDS Submission under 37 CFR 1.290 filed on Aug. 15, 2022 From the US Patent and Trademark Office Re. U.S. Appl. No. 17/322,966.(2 Pages).
USPTO Communication Dated Aug. 17, 2022 RE Third-Party Submission From the US Patent and Trademark Office Re. U.S. Appl. No. 16/494,310.(2 Pages).
USPTO Communication Dated Aug. 17, 2022 RE Third-Party Submission From the US Patent and Trademark Office Re. U.S. Appl. No. 17/322,966.(2 Pages).
European Search Report and the European Search Opinion Dated Feb. 12, 2024 From the European Patent Office Re. Application No. 23210461.2. (12 Pages).
Advisory Action Dated Jul. 26, 2023 from the US Patent and Trademark Office Re. U.S. Appl. No. 16/865,356. (6 pages).
Official Action Dated Jul. 14, 2023 from the US Patent and Trademark Office Re. U.S. Appl. No. 17/322,966. (100 pages).
Official Action Dated Jul. 25, 2023 from the US Patent and Trademark Office Re. U.S. Appl. No. 18/092,347. (43 pages).
Official Action Dated Feb. 21, 2024 from the US Patent and Trademark Office Re. U.S. Appl. No. 16/865,358. (131 pages).
Restriction Official Action Dated Aug. 8, 2023 from the US Patent and Trademark Office Re. U.S. Appl. No. 16/865,358. (7 pages).
Notice of Allowance Dated Sep. 22, 2023 from US Patent and Trademark Office Re. U.S. Appl. No. 16/494,310. (19 pages).
Official Action Dated Jan. 5, 2024 from the US Patent and Trademark Office Re. U.S. Appl. No. 16/865,356. (24 pages).
Official Action Dated Jan. 16, 2024 from the US Patent and Trademark Office Re. U.S. Appl. No. 17/322,966. (23 pages).
Interview Summary Dated May 14, 2024 from the US Patent and Trademark Office Re. U.S. Appl. No. 17/322,966. (2 pages).
Official Action Dated May 7, 2024 from the US Patent and Trademark Office Re. U.S. Appl. No. 18/092,347. (23 pages).
Advisory Action Before the Filing of an Appeal Brief Dated Apr. 23, 2024 from US Patent and Trademark Office Re. U.S. Appl. No. 17/322,966. (4 pages).
Advisory Action Before the Filing of an Appeal Brief Dated Mar. 29, 2024 from US Patent and Trademark Office Re. U.S. Appl. No. 16/865,356. (10 pages).
Official Action Dated Apr. 12, 2024 from the US Patent and Trademark Office Re. U.S. Appl. No. 16/865,356. (17 pages).

* cited by examiner
† cited by third party

METHOD AND APPARATUS FOR PRODUCING A DECORATIVE SURFACE

RELATED APPLICATIONS

This application is a Continuation of U.S. patent application Ser. No. 16/494,307 filed on Sep. 16, 2019, which is a National Phase of PCT Patent Application No. PCT/EP2018/065734 having International Filing Date of Jun. 13, 2018, which claims the benefit of priority of German Patent Application Nos. 10 2017 113 035.7 and 10 2017 113 036.5, both filed on Jun. 13, 2017, and European Patent Application Nos. 18157511.9 filed on Feb. 19, 2018, 18161725.9 filed on Mar. 14, 2018, 18162382.8 filed on Mar. 16, 2018 and 18168263.4 filed on Apr. 19, 2018. The contents of the above applications are all incorporated by reference as if fully set forth herein in their entirety.

FIELD AND BACKGROUND OF THE INVENTION

The present invention concerns a method and an apparatus for producing a decorative surface.

A decorative surface for furniture, floor panels or wall panels is state of the art. Surfaces of workpieces, such as chipboards or MDF boards, are coated with a decoratively printed paper or printed directly after application of a white primer and provided with a protective lacquer. The surfaces are often replicas of real wood surfaces, stones or tiles. Both the image (decoration) of the wood surface and the tactile "haptic" structure (tactile wood pores and knotholes) are reproduced. The surfaces that are coated can however also include (also for the purposes of the present invention) rolled goods such as printed paper or printed plastic foils.

The optical reproduction of decorative images is produced according to the state of the art using both analogue printing processes and digital printing processes based on a digital image template. To create the haptic, tactile structure with a structure depth of usually 5-500 μm, preferably 10-100 μm, an analogue process, such as embossing with structured embossed plates ("matrices"), is used according to the state of the art. It is also known to produces such structures with digital methods as shown in DE 10 2015 110 236 A1 and DE 10 2009 044 802 A1.

DE 10 2007 055 053 A1 discloses a method for processing a structured surface of an embossing tool ("matrice"), whereby the gloss level of a first coating differs from that of a second coating, for example to better simulate wood pores. When such an embossing tool is subsequently used to produce a finished product, e.g. a floor panel, consisting of an HDF backing board and a printed, melamine-impregnated paper as decorative layer, after pressing with the embossing tool the wood pores printed decoratively in the paper become visible against light at an optical viewing angle of less than 45 degrees, also by differences in the gloss level of the cured melamine surface, moulded from the differently processed surface of the matrice. The production of such an embossing tool is a complex process. Furthermore, the embossing tools are usually used in short-cycle presses, in which the change from one embossing tool to another one takes longer time, at least approx. 15-30 min.

SUMMARY OF THE INVENTION

It is therefore an objective of this invention to create an optically and haptically appealing surface and to achieve a quick change from one surface to the next without wasting time and without the high costs of producing a special embossing tool.

This problem is solved by the features of the independent claims. Advantageous embodiments are subject of the subclaims.

In the method for producing a decorative surface having different gloss levels according to the invention, a workpiece, which is coated with at least a first lacquer layer, is fed to a digital printing device, where digital control data are provided, which at least partially match to an optionally existing decorative image on the workpiece. Then, droplets are sprayed digitally on partial areas of the first lacquer layer on the workpiece with an at least partially transparent lacquer in order to apply a second lacquer layer onto the first lacquer layer, wherein after curing, the second lacquer layer has a different gloss level than the first lacquer layer.

The second lacquer layer provides the surface of the workpiece with different gloss levels, so that the gloss level can preferably be matched with the optionally decorative image arranged underneath. By digitally applying the second lacquer layer, the gloss level on the surface can be individually matched depending on the digital printing template, whereby successive workpieces with different gloss levels in different areas can be printed without the need to change a matrice or another tool.

Preferably, the workpiece is fed to a lacquer application device before and coated with at least a first lacquer layer. Then, the workpiece is preferably fed to the digital printing station.

Preferably, the applied lacquer layers are finally physically dried and/or chemically cured.

The gloss level of the first lacquer layer preferably deviates from the gloss level of the second lacquer layer by at least 10 gloss units, preferably at least 20 gloss units, whereby the gloss units are measured according to DIN EN ISO 2813:2015-02 at an angle of 60°. As a result, an optically clearly perceptible gloss effect becomes visible. The gloss level can be varied by the droplet size and/or the number of droplets per area or by the use of matting agents.

Gloss is measured according to DIN EN ISO 2813:2015-02. For the gloss measurement, the amount of light reflected by a surface in relation to a reference standard from polished glass is measured. The unit of measurement used here is GU (Gloss Units). The amount of light reflected from the surface depends on the angle of incidence and the properties of the surface. For gloss measurement, different angles of incidence (20°, 60° and 85°) can be used to measure the reflectance, preferably at an angle of incidence of 60°. Alternatively, the mean value of measurements for the three angles of incidence can also be used. The reflectance compares the light energy emitted from and received by a gloss meter in percent at a certain angle of incidence.

All surfaces or sections of surfaces which, according to the standard, achieve less than 20 gloss units when measured with a gloss meter are defined as "matte", and all surfaces or sections of surfaces which achieve more than 60 gloss units are referred to as "glossy". One of both lacquer layers can be matte and the other one glossy.

The surfaces on the first and second lacquer layers can be smooth or structured. With a structured surface, the gloss is measured and the definition of the distinction between "matte" and "shiny" sub-areas used here is the same as for non-structured surfaces. For example, a structured surface of the workpiece can have a structure depth of 5 300 μm (micrometers), preferably 10-90 μm (micrometers).

For a fine adjustment of the gloss level, the droplets of the second lacquer layer are preferably sprayed with a droplet size smaller than 100 pL, in particular smaller than 10 pL. Optionally, different gloss levels can also be applied to the second lacquer layer, so that differences in gloss can also be present within the second lacquer layer.

With the first lacquer layer, a colored decorative image can be printed in the analog method, for example using printing rollers, or by digital print heads. Alternatively, a transparent lacquer layer can be applied with the first lacquer layer to an existing decorative image.

To produce a structured surface in a production line, a liquid base layer can be applied to a surface of a coated or uncoated workpiece and a structure can be applied to the still liquid base layer using digital print heads or other structuring agents in order to subsequently fix the structured base layer. Optionally, the structured base layer can then form the first lacquer layer or a first lacquer layer is then applied to the structured base layer. For a special optical effect, only the areas with a structure or only the areas without a structure can be printed with the second lacquer layer. This allows an essentially congruent arrangement of structured areas and glossy or matte areas.

BRIEF DESCRIPTION OF THE SEVERAL VIEWS OF THE DRAWINGS

In the following the invention is explained in detail by way of examples and the accompanying drawings. These show.

DESCRIPTION OF SPECIFIC EMBODIMENTS OF THE INVENTION

Figure 1:
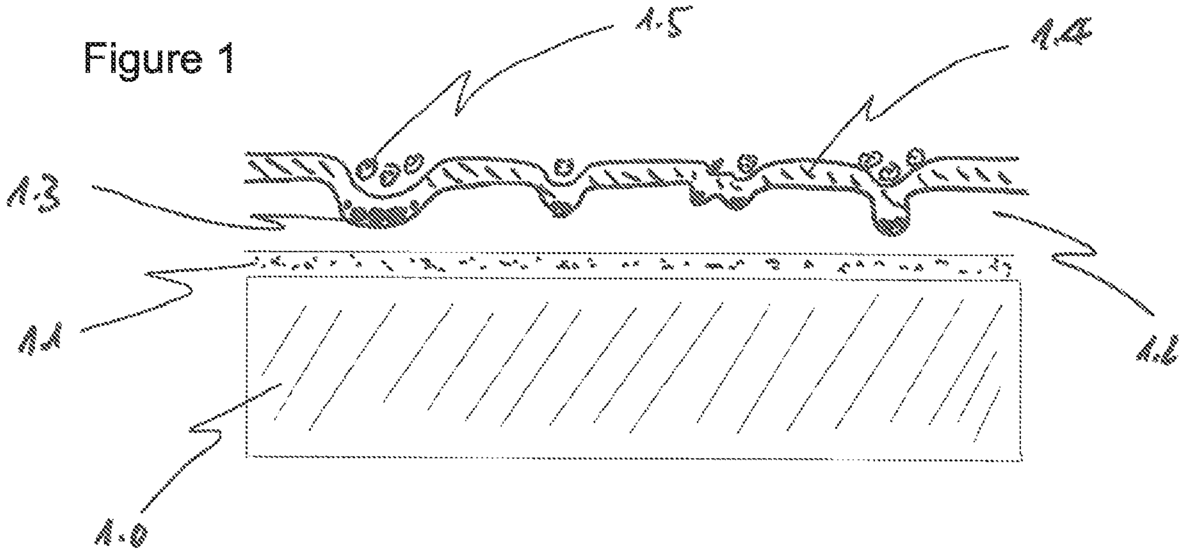
FIG. 1 a schematic cross-sectional view of a plate-shaped workpiece produced by means of the method of the invention.

FIG. 1 shows a plate-shaped workpiece 1.0 on which an optional first base layer 1.1 is provided on one surface. In addition, a decorative image, e.g. a wood reproduction or a tile image, is optionally printed on the workpiece 1.0 before the first base layer 1.1 is applied.

In an alternative embodiment, a decorative image can also be printed on after application of the first base layer 1.1 or after application of a structured second base layer 1.2, for example using a four-colour digital printer.

A second liquid base layer 1.2 is applied to the first base layer 1.1. This second base layer 1.2 has been structured with digitally sprayed droplets 1.3, so that the surface is no longer flat, but has a structure. Subsequently, a first lacquer layer 1.4 is applied, which has a first gloss level.

A second lacquer layer 1.5 is applied to the first lacquer layer 1.4 by digital print heads, whereby the second lacquer layer 1.5 only partially covers the surface of the first lacquer layer 1.4.

Coatings 1.4 and 1.5 are cured one after the other or together, for example by UV radiation. After curing, the second lacquer layer 1.5 has a different gloss level than the first lacquer layer.

Instead of structuring the second base layer 1.2 with digitally sprayed droplets, it is also possible to structure a base layer using other methods, for example by applying it only in certain areas or using embossing matrices. It is also possible to apply the decorative image to a structured surface instead of a flat surface.

Figure 2:
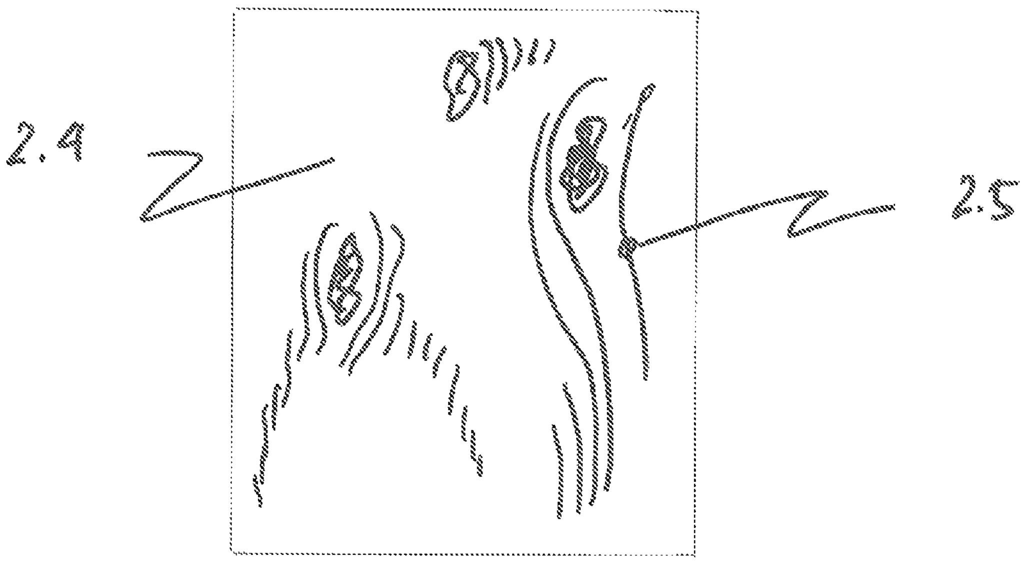
FIG. 2 another schematic illustration of a plate-shaped workpiece produced by means of the method according to the invention with an indicated wood pore in plain view, and FIG. 3 a surface of a printed workpiece.

FIG. 2 shows a plan view of the plate-shaped workpiece 1.0 of FIG. 1 and it can be seen that the decorative image comprises a wood pore 2.5 and grained wood areas 2.4.

The different areas of the wood pore 2.5 and the grained wood areas 2.4 can also have a different gloss level due to the second lacquer layer 1.5, whereby the decorative areas of the image and the different gloss areas are preferably congruent due to the lacquer application.

In a further embodiment, a carrier plate made of a wood material, or a plate made of another material with a thickness of at least 4 mm, preferably 8 to 16 mm and external dimensions of at least 200 mm width and at least 400 mm length is first coated with a UV-curing, white base lacquer, for example with a quantity of about 20 g/qm. This white base lacquer is then cured under UV irradiation.

The carrier plate is then fed to a digital printing device in which a printed image, for example a reproduction of small tiles as mosaics, a wood decor or another pattern, with a four-colour CMYK print, is applied.

Figure 3:
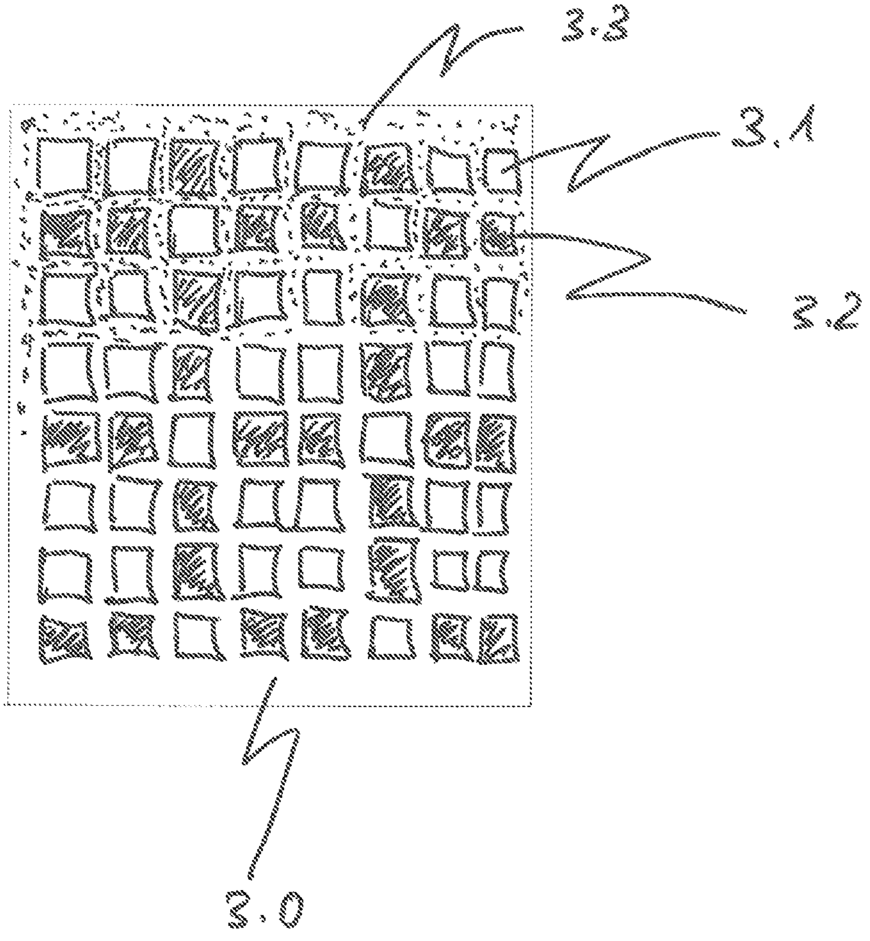

FIG. 3 shows an example of a printed image with two mosaic tiles in different colours, whereby bright mosaic tiles 3.1 and darker mosaic tiles 3.2 are provided.

A variety of other colours of tiles or mosaics with pictorial representations can also be used in an alternative embodiment.

Then a thin base lacquer layer of 5-15 g/sqm of a UV-curing lacquer is applied to the carrier plate printed in this way and (partially) cured with UV light. In an alternative embodiment, this base lacquer layer can be completely omitted or replaced by a solvent lacquer or an aqueous acrylate lacquer, which is then physically dried.

A further base lacquer layer 1.2 is then applied to the first base lacquer layer or alternatively directly to the printed image as a radiation-curing lacquer layer, preferably on an acrylate basis, in a layer thickness of 100-500 μm. Both base lacquer layer can be applied by digital print heads or by printing rollers or other processes.

Directly after the application of this second base lacquer layer 1.2, a further, transparent lacquer layer 1.3 is printed to the still liquid layer, optionally by means of a digital printing template with digital print heads, before curing. When applying this lacquer layer 1.3 the droplet size can vary between 1 pL and 100 pL. The digital printing template used is the one that was also used to print the tile mosaic described above. This printing template is electronically modified beforehand so that only the interspaces 3.3 of the mosaic tiles 3.1 and 3.2 are printed. Then the radiation-curing base lacquer layer 1.2 is cured together with the lacquer layer 1.3 using a UV lamp. In an alternative embodiment, curing can also be performed using electron radiation.

The result is a carrier plate printed with a tile mosaic in which the interspaces 3.3 are recessed by 10-60 μm as joints between the mosaic tiles 3.1 and 3.2.

Subsequently, the gloss level of at least parts of the entire surface is adjusted to the desired value by at least partial application of a second lacquer layer 1.4 with subsequent drying, whereby the gloss level of the first lacquer layer 1.3 deviates from the gloss level of the second lacquer layer.

In an alternative embodiment, the additional application of a third lacquer layer 1.5 can also be carried out before or after the second lacquer layer 1.4 has cured, whereby the third lacquer layer 1.5 also consists of a large number of droplets with a size of 3-100 pL dispensed onto the surface. With this third lacquer layer, both the gloss level can be changed again in some areas and the surface structure depth of the uncured lacquer layer 1.4 can be influenced.

The lacquer layers 1.4 and 1.5 can also be completely omitted if the gloss level is changed by applying the first lacquer layer 1.3 concomitantly with application of the second base lacquer layer 1.2 for structuring.

The surface of the mosaic tiles 3.1 and 3.2 now has a value of 60 to 90 gloss units, for example, while the gloss level at the interspaces 3.3 is only 20 to 40 gloss units, for example.

Optionally, the gloss level at the interspaces 3.3 can also be reduced by a further lacquer layer, which is subsequently printed into the recessed interspaces by a further digital printing device with a transparent, UV-curing lacquer. Then more than just two lacquer layers are applied to adjust the gloss level.

For printing a rather matte lacquer layer, droplet sizes of 3-6 pL are used, which are cured within 0.5-2 sec after impact on the surface by means of UV LED radiation to such an extent that they can no longer flow. This creates a surface structure in these areas that no longer reflects the incident light in a straight line. The gloss level is thereby reduced to values of 30 gloss units and less.

In the method of the invention, the second lacquer layer can have either a higher or lower gloss level than the first lacquer layer. The gloss level can be adjusted using the following methods, for example:

Option 1:

Matte areas through the first lacquer layer consist of previously (analog or digital) applied matte lacquer, for example with matting agents or by an excimer matting. Glossy areas of the second lacquer layer consist of lacquer applied by digital print heads, which lacquer is formed from a plurality of individual droplets, which results in a very smooth surface in certain areas and thus a high gloss level. The droplets have a size of at least 6 pL, and curing only takes place after a progression phase of at least 1 sec, preferably after more than 5 sec.

Option 2:

The glossy areas of the first lacquer layer consist of previously (analog or digital) applied glossy lacquer, matte areas of the second lacquer layer consist of digitally applied lacquer consisting of a plurality of smallest droplets having a droplet size of less than 8 pL, preferably less than 3 pL, which are at least partially cured within less than 3 seconds after application, preferably less than 1 sec after application.

Both options preferably employ curing by a UV-LED lamp, which is arranged in the direction of throughput within less than 100 mm after the digital print heads, which apply the plurality of droplets to the surface.

Matting agents, such as PE waxes or silicas, can be added to the lacquer to produce a matte lacquer layer. The proportion of matting agents in the lacquer can be between 2% to 6%, in particular 3% to 5% (weight percent).

The different Examples of FIGS. 1 and 3 can be combined with one another as desired with regard to the application and structuring of a layer. The number of layers on the workpiece can also be freely selected, depending on the surface structure to be created with the method.

In alternative embodiments of the method according to the invention, acrylate-containing, UV-curing lacquers used as the lacquers can be replaced by aqueous or solvent-based lacquers. In this case, the steps for UV drying by means of UV LED or UV arc lamp are replaced by physical drying by means of hot air or IR lamps or a combination of both.

Finally, several aspects of the present invention are described.

A first aspect of the invention is a method of producing a decorative surface with different gloss levels, comprising the following steps:

A Feeding of a workpiece 1.0 to a lacquer application device;

B Coating of the workpiece 1.0 with at least a first lacquer layer 1.4;

C Feeding of the workpiece to a digital printing station;

D Provision of digital control data for the digital printing station;

E Digital spraying of droplets on partial areas of the first lacquer layer 1.4 on the workpiece 1.0 with an at least partially transparent lacquer in order to apply a second lacquer layer 1.5 to the first lacquer layer 1.4, the second lacquer layer 1.5 having a different gloss level than the first lacquer layer 1.4 after the curing, and F physical drying and/or chemical curing of the applied lacquer layers 1.4, 1.5.

A second aspect of the method according to the first aspect is that the workpiece 1.0 is already printed with a decorative image before method step A.

A third aspect of the method according to the first aspect is that the workpiece 1.0 is printed with at least two different colours using a digital printer after method step A and before method step B.

A fourth aspect of the method according to one of the three preceding aspects is that the digital print data available for the decorative image on the workpiece is used in identical form or in a form modified by a digital manipulation method as a basis for the digital data provided in step D.

A fifth aspect of the method according to one of the four preceding aspects is that the lacquer layer 1.4 applied in step D is at least partially cured before step E by an additional method step.

A sixth aspect of the method according to one of the five preceding aspects is that the gloss level of the first lacquer layer 1.4 deviates by at least 10 gloss units, preferably at least 20 gloss units, from the gloss level of the second lacquer layer 1.5, wherein the gloss units are measured according to DIN EN ISO 2813:2015-02 at an angle of 60°.

A seventh aspect of the method according to one of the six preceding aspects is that in step E, droplets with a droplet size smaller than 10 pL, in particular smaller than 6 pL, are sprayed.

An eight aspect of the method according to one of the seven preceding aspects is that the surface of the workpiece 1.0 has a structure with a structure depth of 5-300 μm (micrometer), preferably 10-90 μm (micrometer), before the second lacquer layer is applied.

A ninth aspect of the method according to the first, second, third or fourth aspect is that in step B, a transparent lacquer layer is applied to an existing decorative image with the first lacquer layer 1.4.

A tenth aspect of the method according to one of the nine preceding aspects is that a liquid base layer 1.2 is applied to a surface of the coated or uncoated workpiece 1.0 and a structure is introduced into the still liquid base layer 1.2 by means of digital print heads, which structure is subsequently fixed, and the structured base layer is the first lacquer layer 1.4, or the first lacquer layer 1.4 is applied to the structured base layer.

An eleventh aspect of the method according to the tenth aspect is that only the areas provided with a structure or only the areas without a structure are printed with the second lacquer layer 1.5.

A twelfth aspect of the method according to one of the eleven preceding aspects is that the two lacquer layers 1.4, 1.5 are applied from an at least partially transparent lacquer, so that a decorative image arranged underneath (1.4, 1.5) can be optically recognized through the two lacquer layers.

A thirteenth aspect of the method according to one of the twelve preceding aspects is that the second lacquer layer 1.5 produces a glossy or high-gloss surface.

A fourteenth aspect of the method according to one of the thirteen preceding aspects is that the second lacquer layer 1.5 produces a matte or less glossy surface.

A fifteenth aspect of the method according to one of the fourteen preceding aspects is that the first and/or second lacquer contains matting agents, preferably in a weight proportion between 2% and 6%, in particular between 3% and 5%.

A further aspect of the invention is an apparatus for carrying out the method according to one of the fifteen aspects described above, comprising:

a first printing device for applying a first lacquer layer 1.4 and a second digital printing device for applying a second lacquer layer 1.5 onto the first lacquer layer 1.4, wherein after curing the second lacquer layer 1.5 has a different gloss level than the first lacquer layer 1.4.

LIST OF REFERENCE SIGNS

1.0 Workpiece
1.1 First base layer
1.2 Second base layer
1.3 Digitally sprayed droplets
1.4 First lacquer layer
1.5 Second lacquer layer
2.4 Grained wood areas
2.5 Wood pore
3.1 Light-coloured mosaic tiles
3.2 Darker mosaic tiles
3.3 Interspaces

What is claimed is:

1. A method for producing a decorative surface having different gloss levels comprising the following steps:

(A) feeding of a workpiece (1.0) to a lacquer application device;

(B) coating the workpiece (1.0) with at least a first lacquer layer (1.4);

(C) feeding of the workpiece (1.0), which is coated with at least the first lacquer layer (1.4) to a digital printing station;

(D) provision of digital control data for the digital printing station;

(E) digital spraying of droplets on partial areas of the first lacquer layer (1.4) on the workpiece (1.0) with an at least partially transparent lacquer in order to apply a second lacquer layer (1.5) on part of the first lacquer layer (1.4) and not entirely on the lacquer layer (1.4), wherein after curing the second lacquer layer (1.5) has a different gloss level than the first lacquer layer (1.4);

wherein the workpiece (1.0) is a printed workpiece printed with a decorative image before method step (A);

wherein:

(i) the workpiece (1.0) is a printed workpiece printed with a decorative image before method step (A); or (ii) the method further comprises printing the workpiece (1.0) with a decorative image after method step (A) and before method step (B);

wherein the method further comprises using digital print data available for the decorative image on the workpiece (1.0) as a basis for the digital control data provided in step (D);

wherein the digital print data is used as a basis for the digital control data provided in step (D) either:

(i) in identical form, or (ii) in a form modified by a digital manipulation.

2. The method according to claim 1, wherein a further step (F) is comprised, in which the applied lacquer layers (1.4, 1.5) are physically dried and/or chemically cured.

3. The method according to claim 1, wherein the workpiece (1.0) is printed with at least two different colors using a digital printer after method step (A) and before method step (B).

4. The method according to claim 1, wherein the lacquer layer (1.4) applied in step (B) is at least partially cured by an additional method step before step (E).

5. The method according to claim 1, wherein the gloss level of the first lacquer layer (1.4) deviates by at least 10 gloss units, from the gloss level of the second lacquer layer (1.5), wherein the gloss units are measured according to DIN EN ISO 2813:2015-02 at an angle of 60°.

6. The method according to claim 1, wherein in step (E), the droplets are sprayed with a droplet size smaller than 10 pL.

7. The method according to claim 1, wherein the surface of the workpiece (1.0) has a structure with a structure depth of 5-300 μm (micrometer) before the second lacquer layer is applied.

8. The method according to claim 1, wherein with the first lacquer layer (1.4), in step (B) a transparent lacquer layer is applied to an existing decorative image.

9. The method according to claim 1, wherein a liquid base layer (1.2) is applied on a surface of the coated or uncoated workpiece (1.0) and a structure is applied into the still liquid base layer (1.2) by means of digital print heads, which structure is subsequently fixed, and the structured base layer is the first lacquer layer (1.4), or the first lacquer layer (1.4) is applied on the structured base layer.

10. The method according to claim 9, wherein only the areas provided with a structure or only the areas without a structure are printed with the second lacquer layer (1.5).

11. The method according to claim 1, wherein the two lacquer layers (1.4, 1.5) are applied from an at least partially transparent lacquer, so that a decorative image arranged underneath (1.4, 1.5) can be optically recognized through the two lacquer layers (1.4, 1.5).

12. The method according to claim 1, wherein the second lacquer layer (1.5) produces a glossy or high-gloss surface and/or the second lacquer layer (1.5) produces a matte or less glossy surface.

13. The method according to claim 1, wherein the first and/or second lacquer contains matting agents.

14. The method according to claim 1, wherein the gloss level of the first lacquer layer (1.4) deviates by at least 20 gloss units from the gloss level of the second lacquer layer (1.5), wherein the gloss units are measured according to DIN EN ISO 2813:2015-02 at an angle of 60°.

15. The method according to claim 1, wherein in step (E), the droplets are sprayed with a droplet size smaller than 6 pL.

16. The method according to claim 1, wherein the first and/or second lacquer contains matting agents in a weight proportion between 2% and 6%.

* * * * *